United States Patent [19]
Arimoto et al.

[11] Patent Number: 5,767,649
[45] Date of Patent: Jun. 16, 1998

[54] MOTOR LOAD SWITCHING SYSTEM

[75] Inventors: Kohei Arimoto; Takeshi Koike, both of Yamanashi, Japan

[73] Assignee: Fanuc, Ltd., Yamanashi, Japan

[21] Appl. No.: 545,319

[22] Filed: Oct. 19, 1995

[30] Foreign Application Priority Data

Nov. 10, 1994 [JP] Japan .................... 6-276403

[51] Int. Cl.⁶ .................... G05B 13/00; G05B 19/18
[52] U.S. Cl. .................... 318/570; 318/571; 318/632; 318/561; 364/474.17; 364/474.21
[58] Field of Search .................... 318/98, 89, 560–696; 364/474.1–474.32; 29/568, 26 A; 409/99, 121, 98

[56] References Cited

U.S. PATENT DOCUMENTS

| | | | |
|---|---|---|---|
| 3,817,647 | 6/1974 | Lemelson | 408/8 |
| 3,909,923 | 10/1975 | Kurimoto et al. | 318/567 |
| 4,268,949 | 5/1981 | Sato | 29/568 |
| 4,277,880 | 7/1981 | Utsumi | 29/568 |
| 4,398,136 | 8/1983 | Tanaka | 318/561 |
| 4,596,066 | 6/1986 | Inoue | 29/568 |
| 4,604,560 | 8/1986 | Inagaki et al. | 318/567 |
| 4,610,074 | 9/1986 | Katsube et al. | 29/568 |
| 4,614,020 | 9/1986 | Kawada et al. | 29/568 |
| 4,733,049 | 3/1988 | Lemelson | 219/121 LJ |
| 4,755,949 | 7/1988 | Shiratori et al. | 364/474 |
| 4,996,762 | 3/1991 | Takayama | 29/568 |
| 5,097,587 | 3/1992 | Yasuda | 29/568 |
| 5,144,740 | 9/1992 | Yasuda | 483/4 |
| 5,485,391 | 1/1996 | Lindstrom | 364/474.17 |

*Primary Examiner*—Paul Ip
*Attorney, Agent, or Firm*—Staas & Halsey

[57] ABSTRACT

A motor load switching system in which a single motor with a single control circuit drives a plurality of different-sized loads by sequentially switching from one load to another. A parameter storage device stores a plurality of parameter sets which are optimized for respective loads. In response to a load switching command, motor control device selects a corresponding parameter set from the parameter storage device and controls the motor according to the selected parameter set. Simultaneously, a load switching device couples the motor with a new load selected from the plurality of loads.

13 Claims, 3 Drawing Sheets

MOTOR LOAD SWITCHING SYSTEM

BACKGROUND OF THE INVENTION

1. Field of the Invention

The present invention relates to a motor load switching system, and more specifically, to a motor load switching system whereby a single motor drives a plurality of different-sized loads by sequentially switching among the loads.

2. Description of the Related Art

Conventional machine tools and other industrial machines incorporate a plurality of motors, which are individually controlled by dedicated control circuits. Each control circuit has many parameters for motor control which are well tuned so as to provide an optimum performance for a specific load coupled to the motor.

Parameters for this motor control include: velocity loop gain, position loop gain, flexible feed gear settings to determine a ratio of least detect increment and actual resolution of a rotary encoder, direction of the motor rotation (i.e., CW or CCW) when a positive motion command is given, command multiply ratio (CMR) to define a ratio of least command increment to least detect increment, phase shift between the reference point and the Z-phase signal (or one-revolution signal) of a rotary encoder, and capacity of reference counter.

If those parameters set in the control circuit were not appropriate to the load coupled to the motor, the load could vibrate or get out of control in the worst case. For this reason, when changing the load, the whole set of parameters should be switched to another set suitable to the new load.

Even if the load is changed and the parameters are altered for the new load, however, the conventional system does not download the new parameters to the control circuit until the next power-up sequence strictly for a safety reason, and therefore, the operator must cycle the main power or interrupt the system by asserting an emergency stop to make the new parameters valid.

In order to switch the load in the middle of a process without cycling the main power or asserting the emergency stop, it is required to have motors and control circuits equalling in number the number of loads. Another way of doing this is to prepare a plurality of control circuits whose parameters are individually adjusted to respective loads and then switch the control circuit in synchronization with switching of the load.

As described above, in the conventional systems for switching the motor load, there is a problem that the parameters changed according to a switching of the motor load remain invalid unless the main power is cycled or the system is interrupted by emergency stop. To avoid this troublesomeness, it is necessary to prepare motors and/or control circuits equalling in number the number of loads. This kind of approach, however, inevitably increases the size of the machine.

SUMMARY OF THE INVENTION

Taking the above into consideration, an object of he present invention is to provide a motor load switching system in which a single motor with a single control circuit drives a plurality of loads.

To accomplish the above object, according to tho present invention, there is provided a motor load switching system in which a single motor drives a plurality of different-sized loads by sequentially switching among the loads.

This system comprises parameter storage means which stores a plurality of parameter sets and each parameter set is optimized for each load. The system also comprises motor control means for controlling the motor using one of the parameter sets selected from the parameter storage means according to a load switching command. The system further comprises load switching means for coupling the motor with one of the loads which is specified by the load switching command.

According to the above structural arrangement, in response to a load switching command, the motor is coupled to a new load specified by the command, and simultaneously, a set of control parameters corresponding to the specified new load is transferred from the parameter storage means to the motor control means. Thus the single motor will control the specified load using the optimized parameter set.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENT

An embodiment of the present invention will be described below with reference to the drawings.

Figure 1:
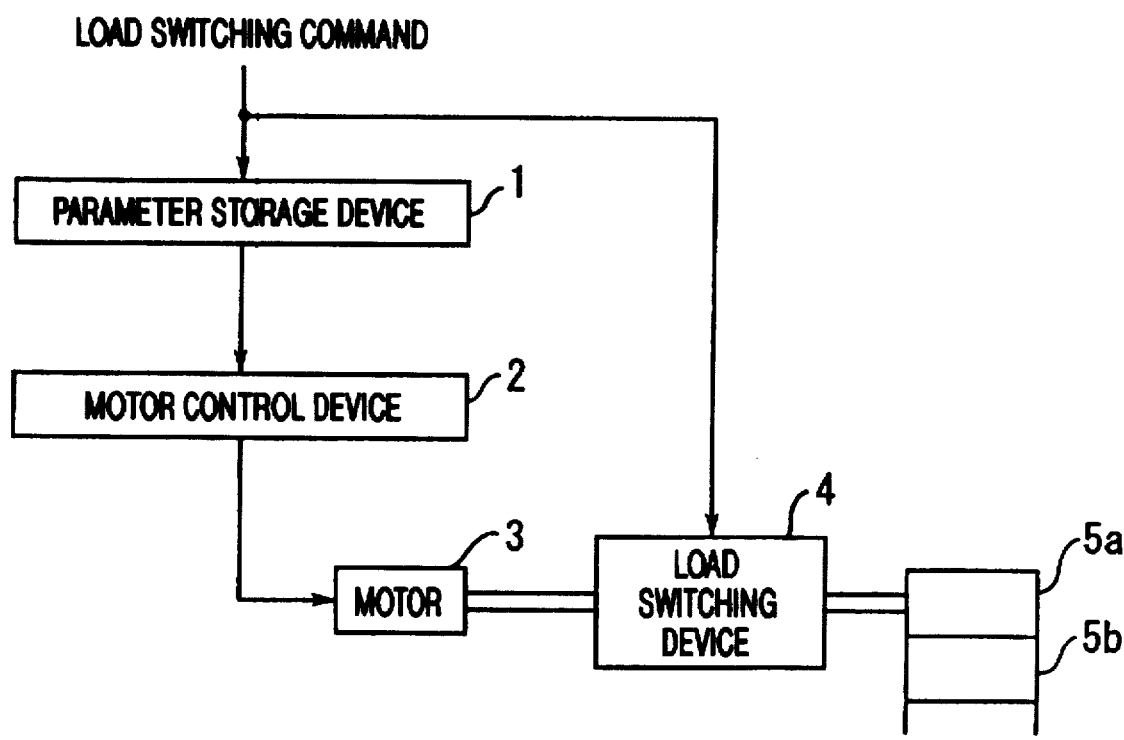
FIG. 1 is a conceptual view of a motor load switching system according to the present invention.

FIG. 1 is a conceptual view of a motor load switching system according to the present invention. The system comprises a parameter storage device 1 for storing parameters, a motor control device 2 for controlling a motor 3, and a load switching device 4 for selecting one of a plurality of loads 5a, 5b and so on and connecting the selected load with the motor 3.

The parameter storage device 1 stores the parameters which are optimized for each of the loads 5a, 5b and so on. In response to a load switching command, relevant parameters are extracted and supplied to the motor control device 2. Upon reception of the new parameters, the motor control device 2 replaces the current parameters with the received new parameters.

The load switching command is also issued to the load switching device 4. Upon reception of the command, the load switching device 4 detaches the current load, selects a new load from the loads 5a, 5b and so on specified by the load switching command, and then attaches the new load to the motor 3. After that, the system starts controlling the new load using the new parameters.

Figure 2:
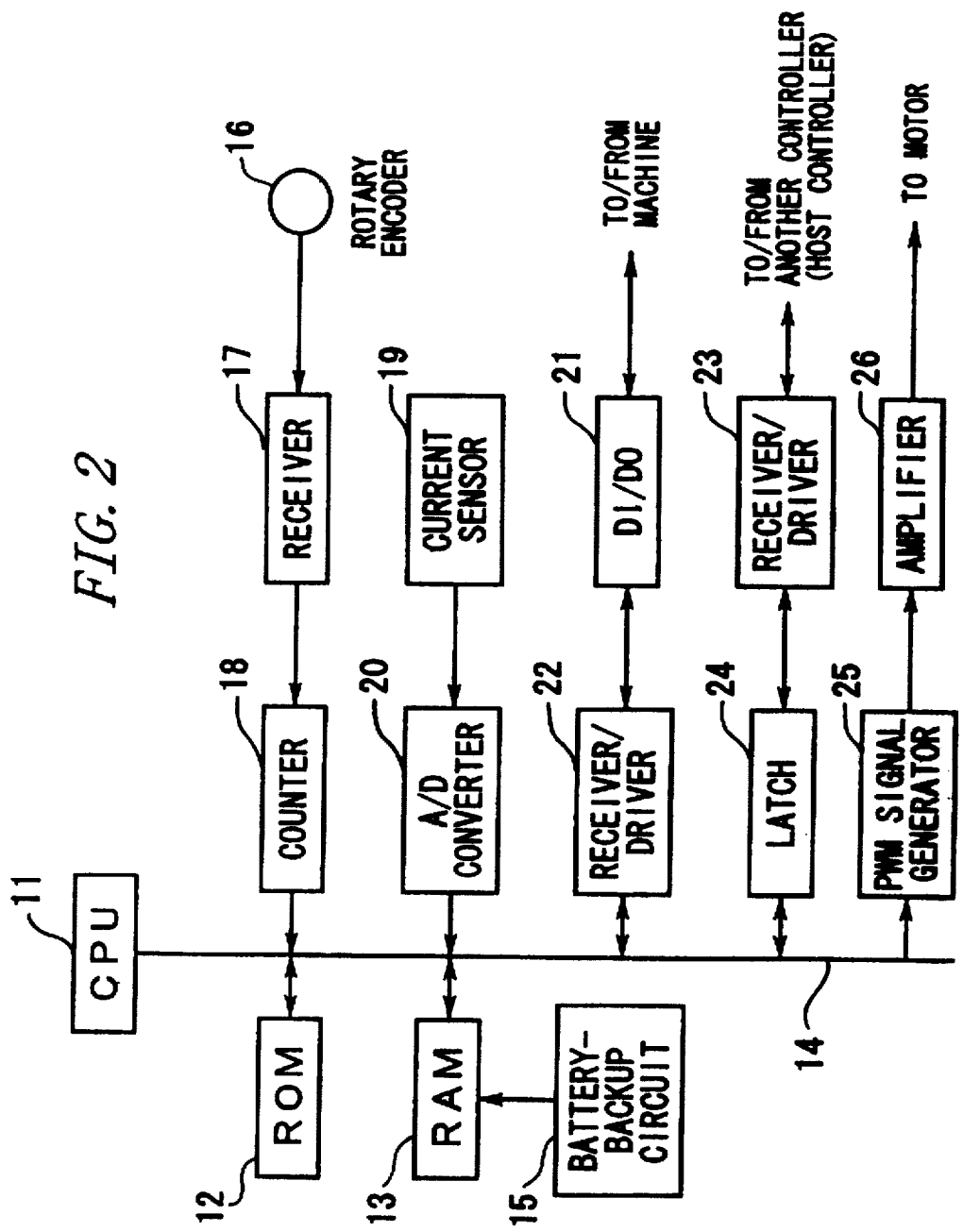
FIG. 2 is a block diagram showing a structure of a motor controller which is embodied according to the present invention.

FIG. 2 is a block diagram showing a structure of a motor controller as an embodiment of the parameter storage device and the motor control means according to the present invention.

Reference numeral 11 in FIG. 2 indicates a processor (CPU) for executing a program and controlling a motor. In case that this controller is responsible in generating a load switching command, this processor 11 will act as the originator of the command. A read-only memory (ROM) 12 and a random access memory (RAM) 13 are connected to the processor 11 via a bus 14. While the ROM 12 stores executive programs, the RAM 13 provides a work area for program execution as well as storage area for the control parameters for various loads, for the RAM 13 is supported by a battery-backup circuit 15 and serves as a non-volatile memory. The motor is equipped with a rotary encoder 16 and its output pulse signale are supplied to a receiver 17 for converting their voltage level. A counter 18 counts the pulses and this count data finally reaches the processor 11 via the bus 14. A current sensor 19 detect the motor current, and its analog output is converted to digital data by an A/D converter 20 and then sent to the processor 11 via the bus 14. Digital inputs and outputs (DI/DO) 21 interface with various devices used in the machine, which are also connected to the bus 14 via receiver/driver 22 for signal level conversion. This controller also incorporates an interface, which consists of receiver/driver 23 and a latch 24 connected to the bus 14, to communicate with another controller. In the case that the controller shown is configured to receive load switching commands from another host controller, the commands will be passed over to the processor 11 through the receiver/driver 23. A pulse width modulation (PWM) signal generator 25 is placed on the bus 14 and its outputs are applied to a motor (not Shown) via an amplifier 26. That is, the PWM signal generator 25 generates PWM signals having pulse widths specified by PWM commands from the processor 11, and the amplifier 26 amplifies the PWM signals to energize the motor.

Although the controller illustrated in FIG. 2 is configured so that the battery-backed RAM 13 stores the parameters for various loads, it is also possible to construct the controller so that the parameters will be stored in other devices such as the ROM 12 or a newly prepared ROM or memory card.

A load switching command, which may be internally issued in this motor controller or commanded from an external host controller, is directed to a load switching mechanism as well as to the motor controller, and it initiates some mechanical actions to switch the load in synchronization with switching the parameters. The following explanation devotes to such a mechanism to switch the load.

Figure 3:
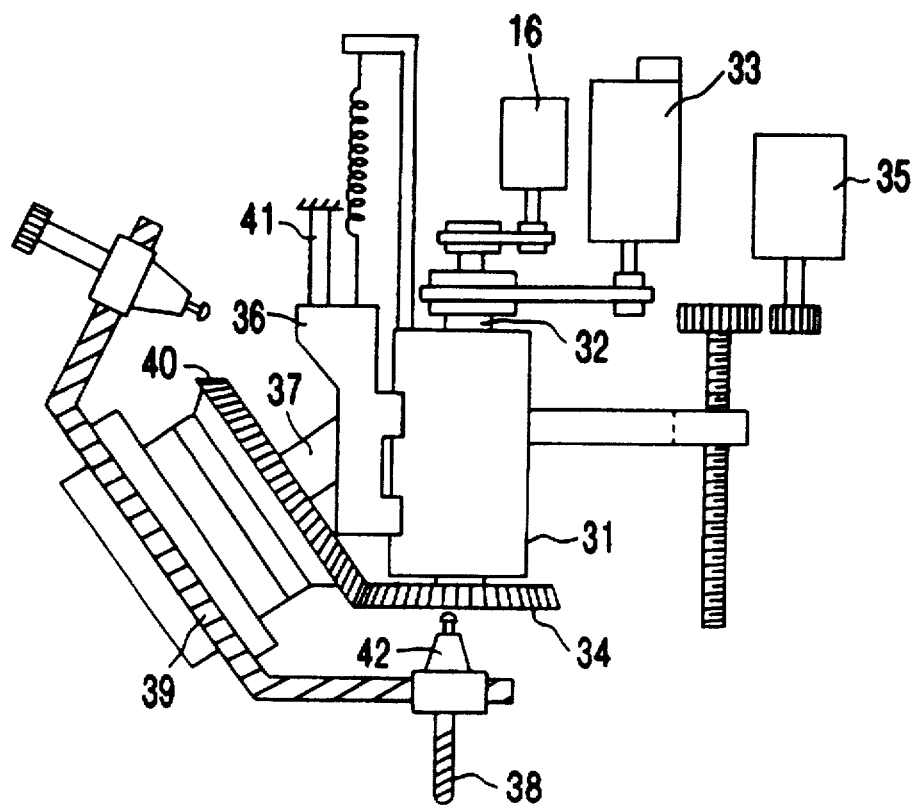
FIG. 3 is a side view illustrating a structure of a load switching mechanism.

FIG. 3 illustrates a structure of a load switching mechanism. This example is an automatic tool changer (ATC) integrated with a spindle unit of a machining center. FIG. 3 shows a view when the ATC is about to change the tool.

A spindle 32 rotatably supported within a spindle head 31 is coupled to a spindle motor 33 and a rotary encoder 16 at its top end. A gear 34 is fixed to the bottom end of the spindle 32. A Z-axis motor 35 drives the spindle head 31 in the vertical direction. A slider 36 is also mounted on the spindle head 31 so that it can slide there in the vertical direction. The slider 36 rotatablly holds an axis 37, and a tool magazine 39, which holds a plurality of tools around its circumference, is fixed to the axis 37. Further, a gear 40 is fixed to the axis 37 so that it engages with the gear 34 which is fixed to the spindle 32.

Because the slider 36 in constantly pulled up by a spring, it has slid up to the top end of the spindle head 31 when the spindle head 31 is at a lower position being driven by the Z-axis motor 35. Here, assume that the spindle head 31 is fed upward from the lower position, while the upward force is applied to the slider 36. The slider 36 first goes up together with the spindle head 31 until it contacts a stopper 41, where the slider 36 stops its upward motion. Being stopped by the stopper 41, the slider 36 than begins a downward motion relative to the spindle head 31. That is, slider 36 slides down on the spindle head 31, thus making the gear 40 approach to the gear 34. The gear 40 is finally engaged with the gear 34 and the Z-axis motor 35 stops feeding the spindle head 31.

FIG. 3 shows this state of engagement of the gears, where the tool magazine 39 is coupled to the spindle motor 33 as its now load. The spindle motor 33 now rotates the tool magazine 39 to select a tool, being controlled with the parameters tuned for this tool magazine indexing operation. When the tool is indexed, the spindle motor 33 is stopped.

After that, in response to a load switching command, the Z-axis motor 35 starts driving the spindle head 31 downward. The gear 34 releases its engagement with the gear 40 because only the spindle head 31 moves down at first, while the slider 36 keeps in contact with the stopper 41. After a while, the slider 36 slides up to the top end of the spindle head 31, where it leaves the stopper 41. The slider 36 then begins to follow the downward motion of the spindle head 31. The spindle head 31 continues to go down, and finally a tapered hole (not shown) of the spindle 32 catches an arbor 42 of of the tool 38. The spindle motor 33 has gained a new load, namely, the tool 38, and the motor controller begins to drive it with another set of the control parameters tuned for the tool.

As described above, according to the present invention, each time the load is switched, the motor controller is provided with parameters optimized for the newly coupled load. This structural arrangement allows a combination of a single control circuit and a single motor to drive any of a plurality of different-sized loads. As a result, the present invention will contribute to miniaturization of machine tools by reducing the number of motors to be used therein.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A motor load switching system in which a single motor drives a plurality of different-sized loads by sequentially switching among the loads, the motor load switching system comprising:

parameter storage means for storing a plurality of parameter sets, wherein each of the parameter sets is optimized for each of the loads;

motor control means for controlling the motor using one of the parameter sets selected from said parameter storage means according to a load switching command; and load switching means for coupling the motor with one of the loads which is specified by the load switching command.

2. A motor load switching system according to claim 1, wherein said parameter storage means is either a read-only memory or a battery-backed random access memory.

3. A motor load switching system according to claim 1, wherein said motor control means internally generates the load switching command according to a program for controlling the motor.

4. A motor load switching system according to claim 1, wherein said motor control means receives the load switching command from an external host controller.

5. A motor load switching system according to claim 1, wherein said plurality of the load include a magazine of an automatic tool changer and at least one tool held on the magazine.

6. A motor load switching system comprising:

a single motor to drive a plurality of loads;

a parameter storage device to store a plurality of parameter sets, with each one of the parameter sets corresponding to one of said plurality of loads;

a motor control device to control said motor using one of said parameter sets chosen from said parameter storage device according to a load switching command; and a load switching device to couple the motor with the load specified by the load switching command.

7. A motor load switching system comprising:

a single motor to drive a plurality of loads; and a parameter storage device to store a plurality of parameter sets, with each one of the parameter sets corresponding to one of said plurality of loads, said parameter storage device determining driving parameters of each of said loads.

8. A motor load switching system as claimed in claim 7 further comprising:

a motor control device to control said motor using one of said parameter sets selected from said parameter storage device according to a load switching command; and a load switching device to switch among the plurality of loads in accordance with the load switching command.

9. A motor load switching system as claimed in claim 7, wherein said parameter storage means is one of a read only memory or a battery backed random access memory.

10. A motor load switching system as claimed in claim 8, wherein said motor control device internally generates the load switching command according to a program for controlling the motor.

11. A motor load switching system as claimed in claim 8, wherein said motor control device receives the load switching command from an external controller.

12. A motor load switching system as claimed in claim 7, wherein said plurality of loads includes a magazine from an automatic tool changer and at least one tool held on the magazine.

13. A motor load switching system comprising:

a single motor to drive a plurality of loads; and a parameter storage device to store a parameter set concerning each of the loads and to supply each of the parameter sets to the motor to control the motor as it drives that particular load.

* * * * *